(12) United States Patent
Trong et al.

(10) Patent No.: US 7,716,266 B2
(45) Date of Patent: May 11, 2010

(54) COMMON SHIFT-AMOUNT CALCULATION FOR BINARY AND HEX FLOATING POINT

(75) Inventors: Son Dao Trong, Stuttgart (DE); Juergen Haess, Schoenaich (DE); Klaus Michael Kroener, Boeblingen (DE); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 1142 days.

(21) Appl. No.: 11/341,256

(22) Filed: Jan. 26, 2006

(65) Prior Publication Data

US 2006/0173946 A1 Aug. 3, 2006

(30) Foreign Application Priority Data

Feb. 1, 2005 (EP) .................. 05100663

(51) Int. Cl.
*G06F 7/38* (2006.01)
*G06F 7/50* (2006.01)
*G06F 7/52* (2006.01)

(52) U.S. Cl. ............... 708/501; 708/495; 708/523; 708/620; 708/670

(58) Field of Classification Search ........... 708/490, 708/495, 501, 503, 505, 523
See application file for complete search history.

(56) References Cited

U.S. PATENT DOCUMENTS

| | | | | |
|---|---|---|---|---|
| 5,161,117 A | * | 11/1992 | Waggener, Jr. | 708/204 |
| 5,687,106 A | * | 11/1997 | Schwarz et al. | 708/499 |
| 5,790,444 A | * | 8/1998 | Olson et al. | 708/501 |
| 5,889,980 A | * | 3/1999 | Smith, Jr. | 712/222 |
| 6,049,865 A | * | 4/2000 | Smith | 712/222 |
| 6,842,765 B2 | * | 1/2005 | Enenkel et al. | 708/501 |
| 7,392,273 B2 | * | 6/2008 | Gerwig et al. | 708/501 |
| 7,451,172 B2 | * | 11/2008 | Powell et al. | 708/501 |
| 7,500,084 B2 | * | 3/2009 | Schwarz et al. | 712/200 |
| 2002/0095451 A1 | * | 7/2002 | Krygowski et al. | 708/495 |
| 2004/0230774 A1 | * | 11/2004 | Schwarz et al. | 712/222 |
| 2005/0228844 A1 | * | 10/2005 | Dhong et al. | 708/501 |
| 2007/0022152 A1 | * | 1/2007 | Gerwig et al. | 708/204 |

OTHER PUBLICATIONS

Gerwig, G.; Wetter, H.; Schwarz, E.M.; Haess, J., "High performance floating-point unit with 116 bit wide divider," 16th IEEE Symposium on Computer Arithmetic, 2003, pp. 87-94, Jun. 15-18, 2003.*

E. Schwarz, "Binary Floating-Point Unit Design", book chapter in High Performance Energy Efficient Microprocessor Design, Springer, Edited by R. Krishnamurthy and V. G. Oklobdzija, Mar. 2006.*

* cited by examiner

*Primary Examiner*—Chat C Do
*Assistant Examiner*—Matthew Sandifer
(74) *Attorney, Agent, or Firm*—John E. Campbell

(57) ABSTRACT

A method and system for performing a binary mode and hexadecimal mode Multiply-Add floating point operation in a floating point arithmetic unit according to a formula A*C+B, wherein A, B and C operands each have a fraction and an exponent part expA, expB and expC and the exponent of the product A*C is calculated and compared to the exponent of the addend under inclusion of an exponent bias value dedicated to use unsigned biased exponents, wherein the comparison yields a shift amount used for aligning the addend with the product operand, wherein a shift amount calculation provides a common value CV for both binary and hexadecimal according to the formula (expA+expC−expB+CV).

10 Claims, 4 Drawing Sheets

COMMON SHIFT-AMOUNT CALCULATION FOR BINARY AND HEX FLOATING POINT

FIELD OF THE INVENTION

The present invention relates to a method and circuit for performing a combined Multiply-Add floating point operation in a floating point arithmetic unit.

BACKGROUND OF THE INVENTION

Referring to FIG. 1 a final sum is calculated according to a formula A*C+B, with an addend 20, a multiplicand 21 and a multiplier 22, wherein A, B and C each have a fraction and an exponent part, and the exponent of the product A*C, calculated by multiplier 23, is calculated and compared to the exponent of the addend 20 under inclusion of an exponent bias value dedicated to use unsigned biased exponents. The comparison yields a shift amount denoted herein as SA, which is used for aligning the addend 20 with the product operand 24 in order to build the final sum. Exemplary prior art is given by U.S. Pat. No. 5,166,898 incorporated herein by reference.

With reference to FIG. 1 the prior art provides an arithmetic unit designed to be operable in two distinct operation modes, in which the A, B, C operands 20, 21, 22, respectively, are represented in their totality in a respective specific type of floating point format, for instance, wherein all operands have either a binary IEEE-compliant representation, or all operands having a hexadecimal representation, which is fabricated by the applicant in the prior art arithmetic processors of the IBM z/Series and of IBM S/390, which can be found e.g. in proceedings of $16^{th}$ IEEE Symposium on Computer Arithmetic, ARITH-16, June 2003 in article "High Performance Floating-Point Unit with 116 bit wide Divider" ISBN 0-7695-1894-x ISSN 1063-6889 incorporated herein by reference.

Other prior art arithmetic units also offer a dual mode operation, wherein all operands have either a binary IEEE-compliant representation, or all operands have a different—e.g., an octal—representation.

It should be noted that no mixed mode operation, wherein one operand is binary for example, and the other two are hexadecimal, is the subject of the present invention.

In the prior art defined by arithmetic units of the applicant in the IBM z-series and in IBM S/390, the shift amount SA is calculated as follows:

SA=expA+expC−bias−expB+constant=expA+expC−expB−constant2 (constant2=bias−constant)

The constant is needed to compensate for an eventual shift left of the addend before adding product and addend operand.

Disadvantageously, hexadecimal and binary formats have different bias values; therefore the constant2 value is different for hexadecimal and binary, see logic 25A for binary and 25B for hexadecimal:

IEEE 754 standard notations (s:=sign, f:=fraction):
Binary Single=(−1)**S*1.F*2**(exp−127)
Binary Double=(−1)**S*1.F*2**(exp−1023)
Binary Quad=(−1)**S*1.F*2**(exp−16383)
It should be noted that the binary bias is of the form (2**(N−1))−1.
IBM S/390 hexadecimal notation:

Hexadecimal=(−1)**S*0.F*16**(exp−64)

It should be noted that the hex bias is of the form (2**(N−1)).

With respect to further increased clock rates the above shift amount calculation is very timing critical because it is used to align the addend into a very wide dataflow. In prior art implementations of the above-mentioned z-series, either two different constant values are multiplexed in a multiplexer 26 in front of a 4-port adder, or two 4-port adders are used to calculate both shift amount values, wherein the correct value for the particular operational mode (e.g. binary or hexadecimal) is selected later on.

The above-mentioned first option has an increased delay since the select signal must drive an exponent width multiplexer (for example a 13-bit multiplexer for a 64-bit dataflow) in order to select the constant, whereas the second option needs more hardware and still adds a multiplexer stage to the critical path.

Disadvantageously, both prior art alternatives are too slow for offering a further increased cycle rate required for new processor designs.

OBJECTIVES OF THE INVENTION

It is thus an objective of the present invention to provide a method according to the preamble of claim 1, which can be operated with a higher clock rate.

SUMMARY OF THE INVENTION

This objective of the invention is achieved by the features stated in enclosed independent claims. Further advantageous arrangements and embodiments of the invention are set forth in the respective dependent claims. Reference should now be made to the appended claims.

According to the most basic aspect of the present invention a method is disclosed for performing a combined Multiply-Add floating point operation in a floating point arithmetic unit according to a formula A*C+B, wherein A, B and C each have a fraction and an exponent part and the exponent of the product A*C is calculated and compared to the exponent of the addend under inclusion of an exponent bias value dedicated to use unsigned biased exponents, wherein the comparison yields a shift amount SA used for aligning the addend with the product operand, wherein the unit is designed to be operable in two distinct operation modes, in which the A, B, C operands are represented in their totality in a respective specific type of floating point format, for instance all operands of an instruction having either a binary IEEE-compliant representation, or all operands having a hexadecimal representation, which method is characterized by the step of using within a shift amount calculation logic provided for the alignment a common value CV for both operation modes, which is added to the exponents as:

expA+expC−expB+CV.

The common value CV can be expressed as a function of three parameters:
the radix point distance d (db for binary, dx for hexadecimal, do for octal formats) of the fractions of the product and the addend,
The above-mentioned bias value,
The offset osl involved for shifting-left a fraction operand for normalization.

As the common value CV is dependent of the three above parameters, which can be varied independently from each other within certain usefully preset ranges, a common value CV can be achieved in multiple different ways. For example, a common bias value CBV can be selected as second condition for restricting the result space for CV.

By the before-mentioned solution the fraction of the addend operand B is shifted by a shift amount SA for addition with the product A*C relative to the most significant bit (MSB) of the product. That shift amount can be calculated equally in the same way, both for hexadecimal and binary format, or binary and octal format.

From that the advantage results that a generic approach is found, by which—based on the single, common (bias) value CV or CBV, respectively,—a common shift amount calculation for the product and the addend operand can be performed; this speeds up the shift amount calculation and the arithmetic unit may then be clocked with higher frequency, as a multiplexer required for selecting an individual mode-specific bias value as in prior art needs not to be used.

According to a further preferred feature of the invention, this method can be applied to binary (IEEE) and hexadecimal formats.

According to a further preferred feature of the invention, the before-mentioned value of osl is defined in a particular way, such that the common bias value CBVhb for a hexadecimal and a binary format compliant to IEEE, is exemplarily:

CBVhb=−bias+offset+osl;

CBVhb=−(hex)"7FC4"+osl=(hex)"803C"+osl= (hex)"8080";

This results in a common value CBVhb of hexadecimal '8080', a bit string, of which the 7 lowest bits are all zero and the shift amount calculation saves a respective adder circuitry as it requires only three instead of four 16-bit adders in an architecture having an exponent length of 16 bits.

With the lowest 7 bits of the constant being all zero, instead of a 4-port adder a 3-port adder can be used for the shift amount calculation of the lower part of the addend, which once again helps to speed up the calculation as the lowest bit portion is used first for alignment. It is basically not necessary to set more then the lowest seven bits to all zero, because the shift amount is not needed to be set higher than a value of 2 (exp 8)−1=255, in order to align two 64-bit operands in an exemplarily selected 64-bit architecture.

According to a further preferred feature of the invention, the before-mentioned value of osl is defined in a particular way, such that a common bias value CBVob can be obtained analogue to the example above for an octal and a binary format compliant to IEEE, as:

CBVob=−(hex)"7FC1"+osl;

Also in this case osl can be defined such that a plurality of 7 bits of the constant CBVob are all zero:

CBVob=−(hex)"7FC1"+osl=(hex)"8040"30 osl= (hex)"8080";

BRIEF DESCRIPTION OF THE DRAWINGS

The present invention is illustrated by way of example and is not limited by the shape of the figures of the drawings in which.

DETAILED DESCRIPTION OF PREFERRED EMBODIMENTS

Figure 1:
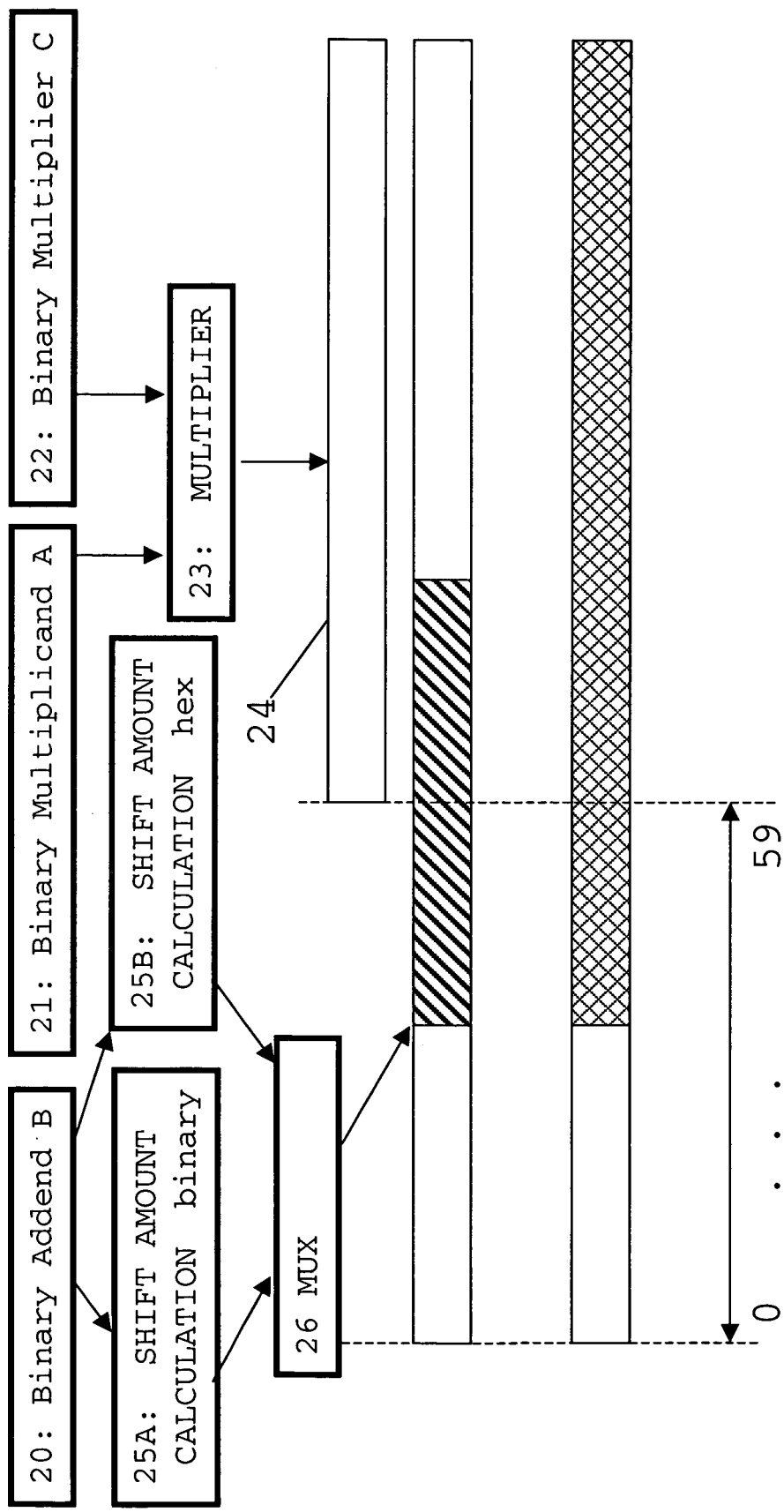
FIG. 1 is a schematic diagram illustrating the shift amount calculation and usage in prior art with dedicated calculation for each format (all 3 operands shown as binary, but can also be all in hex format)
Figure 2:
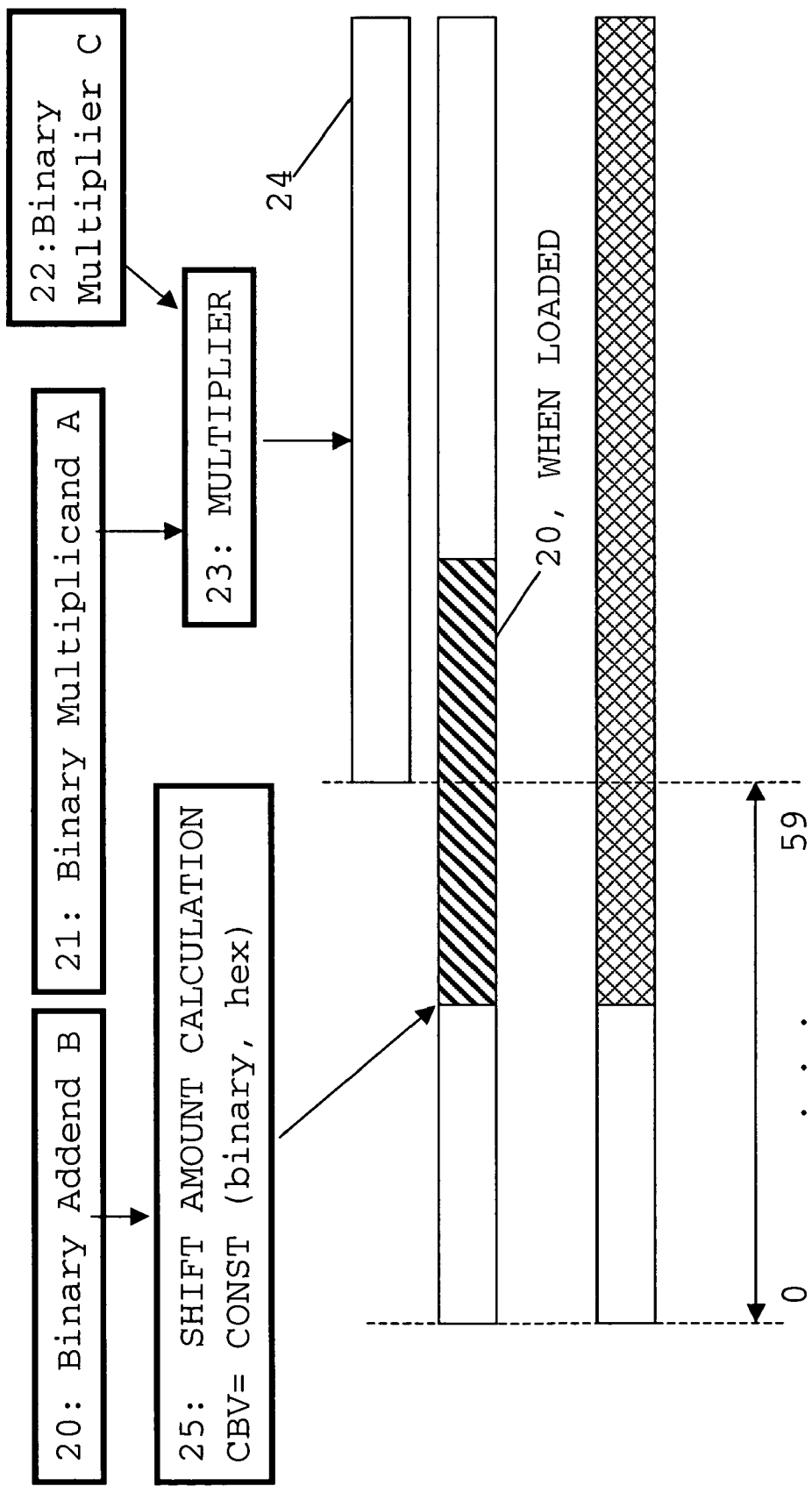
FIG. 2 is a schematic diagram illustrating the shift amount calculation according to a preferred embodiment of the invention in an overview.
Figure 3:
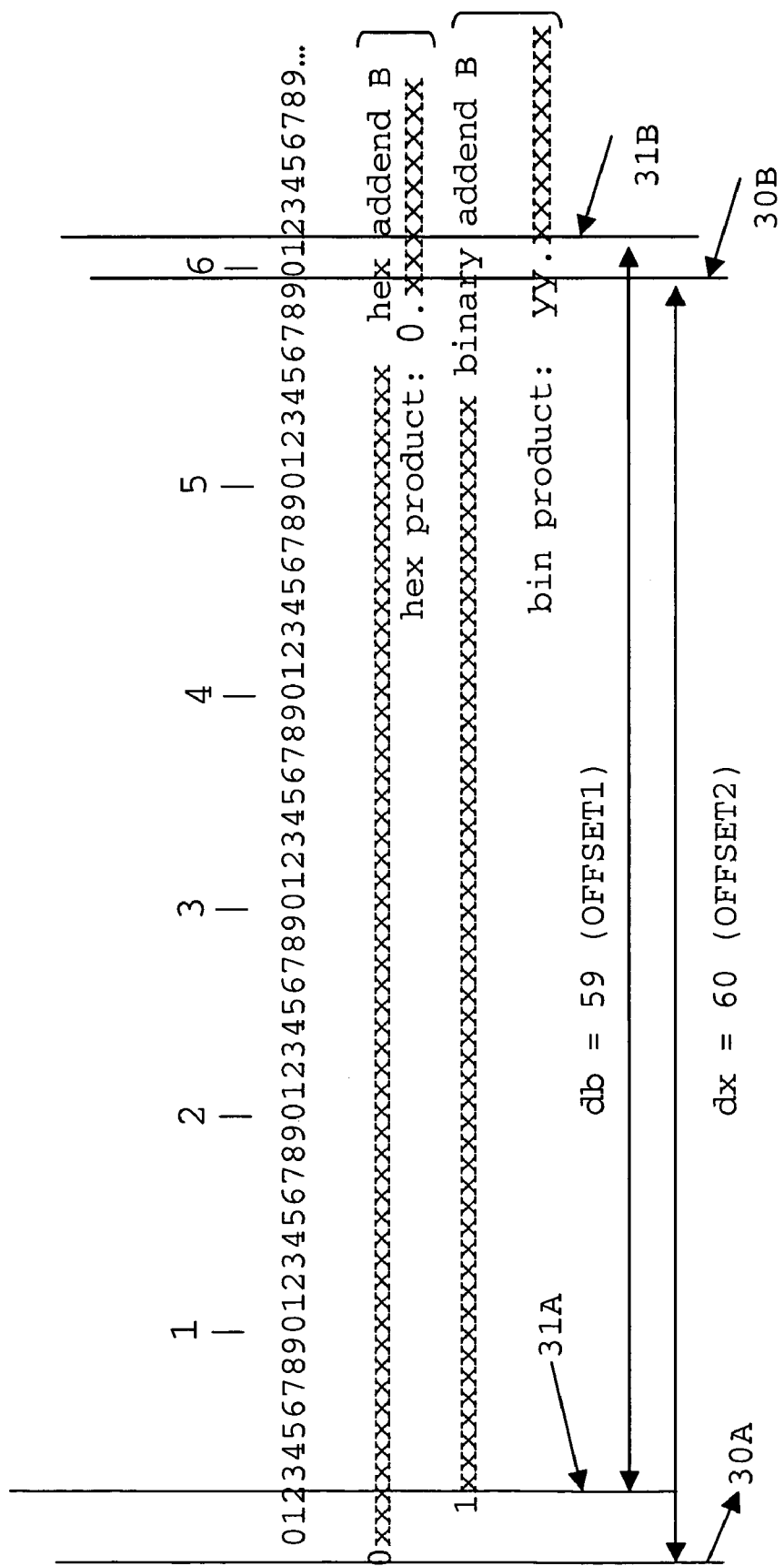
FIG. 3 depicts details of FIG. 2 comprising the loading location of the most significant bits (MSB of the addend including the principle of a common shift amount for both binary and hexadecimal format, and FIG. 4 is a drawing according to FIG. 3, adapted for accommodating the combination of binary (IEE) and octal format.

With general reference to the figures and with special reference now to FIGS. 2 and 3 the shift amount calculation for hexadecimal and binary floating point operation modes is introduced as follows for an exemplary architecture having the specification as mentioned above:

The dataflow has 60 bits left to the product to account for the case where the addend B has to be shifted left as mentioned above.

The MSBs of the multiplier C and multiplicand A are left-aligned in the multiplier circuit 23 so that the product is left aligned. For hexadecimal format, the radix point 30 is left to the product bits, whereas for binary format the radix point 31 is located between the second and third bit of the product, as depicted in FIG. 3.

It should be noted that the notation "yyxxxx . . . "= "yy.xxxxx" as the usage of yy versus xx serves for separation of bits left and right of the floating point.

The exponent path is extended to 16 bits; the extension is used to detect carries from multiplier 23 in the yy-bits seen in FIG. 3, and the adder later in the floating-point calculation to detect overflow.

For binary floating point, the shift amount calculation for a multiply-add instruction is done as follows:

operation: AxC+B

SA=ExpA+ExpC−ExpB−x'7FFF'+db+osl with (x'7FFF'=bias of binary exponent)

SA=ExpA+ExpC−ExpB−const1 with:

db: distance of radix points for binary min=56, max=60
osl: offset to account for shift left, >=52
x' denotes hexadecimal format.

For hex floating point, the shift amount calculation for a multiply-add instruction is done as follows:

operation: AxC+B

SA=ExpA+ExpC−ExpB−x'8000'+dx+osl with x'8000'=bias of hexadecimal exponent)

SA=ExpA+ExpC−ExpB−const2 dx: distance of radix points for hex=60
osl: offset to account for shift left, >=52

Starting with the positioning of the hexadecimal operands, dx is set to dx=60 for a minimum hardware dataflow-width implementation.

According to the principles of the present invention it is proposed to equate the definitions for the respective two specific bias values expressed in terms of:

a) the distance d between the floating point radix points of product and the addend, and
b) the offset osl involved for a shift-left an operand.

Thus, an equation is provided for the definitions to determine db for binary operands such that the constants const1 and const2 are equal:

const1=−x'7FFF'+db+osl=−x'8000'+dx+osl=const2

Resolving the equation leads to:

$$db = -1 + dx$$

$$db = -1 + 60 = 59$$

With the values of db=59 and dx=60 respectively, for the shift amount calculation the same single constant value is provided for both bin and hex.

$$\begin{aligned}
\text{binary: } SA &= ExpA + ExpC - ExpB - x'7FFF' + \text{offset} \\
&= ExpA + ExpC - ExpB - x'7FFF' + 59 + osl \\
&= ExpA + ExpC - ExpB - x'7FC4' + osl \\
&= ExpA + ExpC - ExpB - const1
\end{aligned}$$

$$\begin{aligned}
\text{hex: } SA &= ExpA + ExpC - ExpB - x'8000' + \text{offset} \\
&= ExpA + ExpC - ExpB - x'8000' + 60 + osl \\
&= ExpA + ExpC - ExpB - x'7FC4' + osl \\
&= ExpA + ExpC - ExpB - const2
\end{aligned}$$

Thus the commonly used constant for binary (IEEE) and IBM-hexadecimal format is:

$$CBVhb = const1 = const2 = -x'7FC4' + osl$$

Furthermore, according to a preferred aspect of the invention for further speeding up the shift amount calculation, the value of osl is defined such that the 7 lowest bits of the constant value are all zeros, so that only three terms have to be added.

An example is given next, in order to illustrate such calculation of osl:
binary:bias=0111111111111111=x'7FFF'
ExpA=0011111011001010=x'3ECA'
ExpC=0111010101111011=x'757B'
ExpB=0011010000111001=x'3439'

First, the expression "-x'7FC4'" is generated according to the formula:

$$-X = X + 1 \quad (X \text{ is bitwise inversion of } X)$$

```
 x' 7FC4 ' =  0111111111000100
-x' 7FC4 ' =  1000000000111011
                            + 1
                  ─────────────
-x' 7FC4 ' =  1000000000111100
```

Then the shift amount is calculated as follows:

```
SA= ExpA +  ExpC  - ExpB  - x' 7FC4 ' + osl
    =  0011111011001010
    +  0111010101111011
    -  0011010000111001
    +  1000000000111100
    +          1000100 ( = osl  = x' 44 ' = 68)
       ─────────────────
    =  0011111011001010
    +  0111010101111011
    -  0011010000111001
    +  1000000010000000 = - x' 7FC4 ' + osl = x' 8080 '
       ─────────────────
            ◄------►
```

As the 7 lowest significant bits (LSB) of the constant are all zero, there are only three operands to be added. Thus, one adder can be saved for these lower bits.

Figure 4:
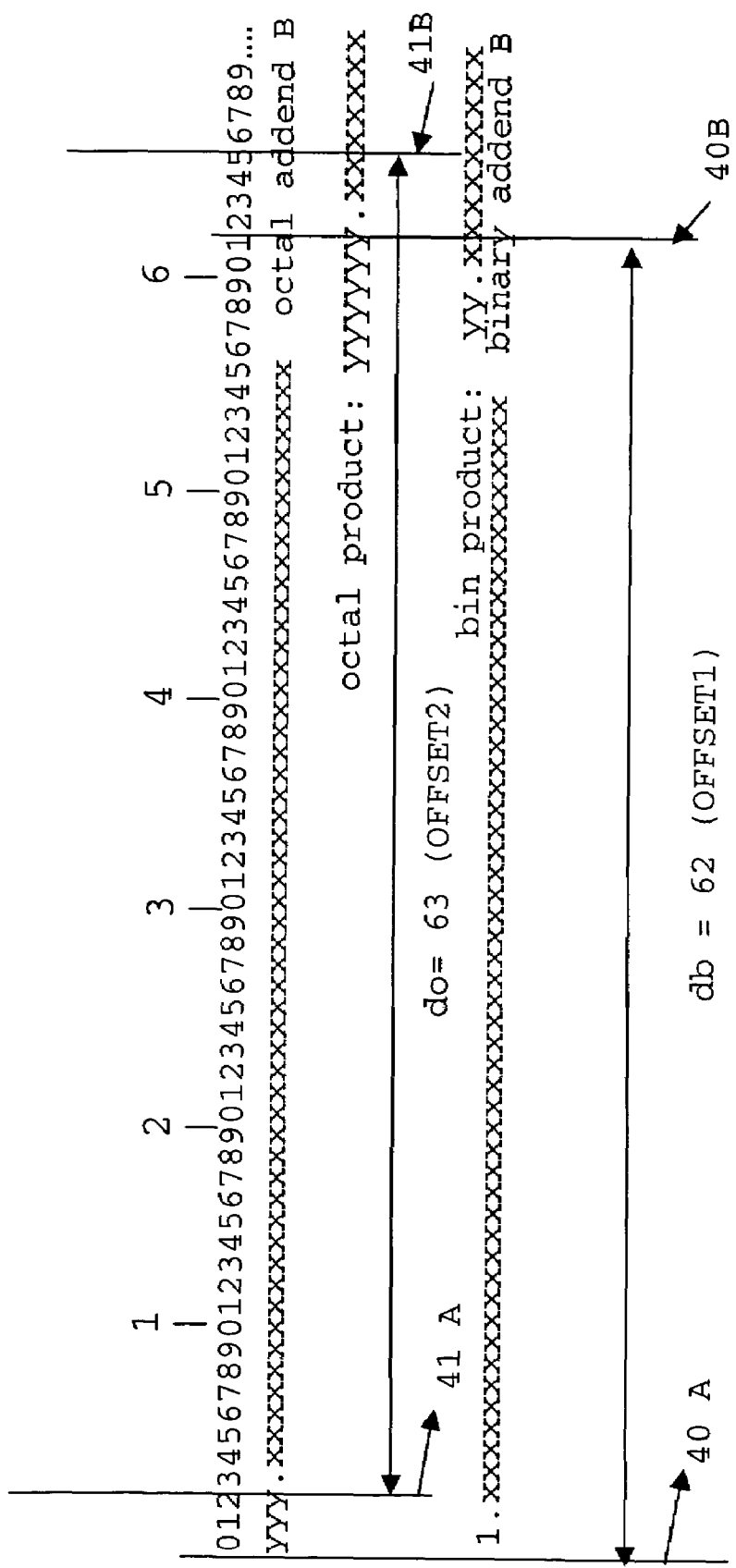

Next, and with reference to FIG. 4 an example with a further different format combination of binary and octal format is given:
binary IEEE: 1.xxxx, bias value=x'7FFF'
  octal: x.xxx, bias value=x'8000'
The shift amount calculation is done as follows for the binary format:

$$SA = ExpA + ExpC - ExpB - x'7FFF' + db + osl$$
$$(x'7FFF' = \text{bias of IEEE binary exponent}),$$

which yields:

$$SA = ExpA + ExpC - ExpB - const1$$

with:
db: distance of radix points for binary min=56, max=60
osl: offset to account for shift left, >=52, as it was already mentioned above.

The shift amount calculation is done as follows for octal format:

$$SA = ExpA + ExpC - ExpB - x'8000' + db + osl$$
$$(x'8000' = \text{bias of octal exponent})$$

$$= ExpA + ExpC - ExpB - const2$$

do: distance of radix points 41A, 41B for octal min=56, max=60;
osl: offset to account for shift left, >=52

Starting with the positioning of octal operands, the radix point distance do is set to do=63—see arrow 41—for a selected minimum hardware dataflow-width implementation.

For binary operands the radix points are denoted as 40A, 40B, respectively. The equation for determining the radix point distance db for binary operands such that the constants const1 and const2 are equal is given as follows:

$$const1 = -x'7FFF' + db + osl = -x'8000' + do + osl = const2$$

Resolving the equation yields, see arrows 40:

$$db = do - 1 = 62$$

which yields as common constant for octal and binary format:

$$CBVob = const1 = const2 = -x'7FC1' + osl$$

$$CBVob = x'8040' + osl = x'8080'$$

Resulting in osl=(hex)"40"=64
Of course, the calculation can be reversed, by beginning with the setting of do and deriving db there from.

What is claimed is:

1. A hardware arithmetic processor method for performing a combined Multiply-Add floating point operation in any of two or more floating point formats using a floating point arithmetic unit, the operation comprising multiplying a multiplicand value A by a multiplier value C to produce a product value and adding an addend value B to the product value according to the formula A*B+C, the method comprising the steps of:
  determining a common value, the common value useful for any of said two or more floating point formats having different biases, the common value for determining a shift amount;
  responsive to the combined Multiply-Add floating point operation being a first floating point format having a first bias value (Bias1), performing the steps a) through c) comprising;

a) determining a shift amount (SA1), the determination of the shift amount consisting of arithmetically combining each of a first floating point exponent (ExpA1) of the first format, a second floating point exponent (ExpB1) of the first format, a third floating point exponent (ExpC1) of the first format and the common value (Constant1) wherein SA1=ExpA1+ExpC1−ExpB1−Constant1;

b) aligning a third floating point fraction of the first format with a multiplication product value of the first format according to the determined shift amount; and c) adding the aligned third floating point fraction of the first format to the multiplication product value of the first format; and responsive to the combined Multiply-Add floating point operation being a second floating point format having a second bias value (Bias2), said second bias value being different than the first bias value, performing the steps d) through f) comprising:

d) determining a shift amount (SA2), the determination of the shift amount consisting of arithmetically combining each of a first floating point exponent (ExpA2) of the second format, a second floating point exponent (ExpB2) of the second format, a third floating point exponent (ExpC2) of the second format and the common value (Constant2), wherein SA2=ExpA2+ExpC2−ExpB2−Constant2;

e) aligning a third floating point fraction of the second format with a multiplication product value of the second format according to the determined shift amount; and f) adding the aligned third floating point fraction of the second format to the multiplication product value of the second format;

wherein

Constant1=Bias1−db1−osl1,

Constant2=Bias2−db2−osl2, and

Constant 1=Constant2, wherein db1 is a distance between floating point radix points of a product of the first format A1*C1 and an addend B1 of the first format and osl1 is a shift-left operand of the first format, wherein db2 is a distance between floating point radix points of a product of the second format A2*C2 and an addend B2 of the second format and osl2 is a shift-left operand of the second format.

2. The method according to claim 1, wherein the determining the common value step comprises the further step of: adding an offset (osl) to a predetermined value to produce the common value, wherein the predetermined value is −x'7FC4', wherein −x'7FC4' is any one of '1000 0000 0011 1100' or x'803C' to produce the common value.

3. The method according to claim 1, wherein the first format is a hexadecimal format and the second format is a binary format.

4. The method according to claim 1, wherein the first format is a hexadecimal format according to IBM z/Architecture and the second format is a binary format according to IEEE 754 standard.

5. The method according to claim 1, wherein the first format is an octal format.

6. A system for performing a combined Multiply-Add floating point operation in any of two or more floating point formats using a floating point arithmetic unit, the operation comprising multiplying a multiplicand value A by a multiplier value C to produce a product value and adding an addend value B to the product value according to the formula A*B+C, the system comprising:

a hardware arithmetic processor comprising a floating point arithmetic unit, the hardware arithmetic processor executing a method comprising:

determining a common value, the common value useful for any of said two or more floating point formats having different biases, the common value for determining a shift amount;

responsive to the combined Multiply-Add floating point operation being a first floating point format having a first bias value (Bias1), performing the steps a) through c) comprising;

a) determining a shift amount (SA1), the determination of the shift amount consisting of arithmetically combining each of a first floating point exponent (ExpA1) of the first format, a second floating point exponent (ExpB1) of the first format, a third floating point exponent (ExpC1) of the first format and the common value (Constant1) wherein SA1=ExpA1+ExpC1−ExpB1−Constant1;

b) aligning a third floating point fraction of the first format with a multiplication product value of the first format according to the determined shift amount; and c) adding the aligned third floating point fraction of the first format to the multiplication product value of the first format; and responsive to the combined Multiply-Add floating point operation being a second floating point format having a second bias value (Bias2), said second bias value being different than the first bias value, performing the steps d) through f) comprising:

d) determining a shift amount (SA2), the determination of the shift amount consisting of arithmetically combining each of a first floating point exponent (ExpA2) of the second format, a second floating point exponent (ExpB2) of the second format, a third floating point exponent (ExpC2) of the second format and the common value (Constant2), wherein SA2=ExpA2+ExpC2−ExpB2−Constant2;

e) aligning a third floating point fraction of the second format with a multiplication product value of the second format according to the determined shift amount; and f) adding the aligned third floating point fraction of the second format to the multiplication product value of the second format;

wherein

Constant1=Bias1−db1−osl1,

Constant2=Bias2−db2−osl2, and

Constant1=Constant2, wherein db1 is a distance between floating point radix points of a product of the first format A1*C1 and an addend B1 of the first format and osl1 is a shift-left operand of the first format;

wherein db2 is a distance between floating point radix points of a product of the second format A2*C2 and an addend B2 of the second format and osl2 is a shift-left operand of the second format.

7. The system according to claim 6, wherein the determining the common value step comprises the further step of: adding an offset (osl) to a predetermined value to produce the common value, wherein the predetermined value is −x'7FC4', wherein −x'7FC4' is any one of '1000 0000 0011 1100' or x'803C' to produce the common value.

8. The system according to claim 6, wherein the first format is a hexadecimal format and the second format is a binary format.

9. The system according to claim 6, wherein the first format is a hexadecimal format according to IBM z/Architecture and the second format is a binary format according to IEEE 754 standard.

10. The system according to claim 6, wherein the first format is an octal format.

* * * * *